US012729212B2

(12) United States Patent
Hirai et al.

(10) Patent No.: US 12,729,212 B2
(45) Date of Patent: Sep. 8, 2026

(54) METHOD FOR PRODUCING (2-METHYLPYRIMIDIN-5-YL)BORONIC ACID DERIVATIVE

(71) Applicant: KANEKA CORPORATION, Osaka (JP)

(72) Inventors: Yoshinori Hirai, Hyogo (JP); Kohei Mori, Hyogo (JP); Hiroaki Yasukouchi, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 531 days.

(21) Appl. No.: 18/462,917

(22) Filed: Sep. 7, 2023

(65) Prior Publication Data

US 2023/0416281 A1 Dec. 28, 2023

Related U.S. Application Data

(63) Continuation of application No. PCT/JP2022/012043, filed on Mar. 16, 2022.

(30) Foreign Application Priority Data

Mar. 29, 2021 (JP) ................................ 2021-056124

(51) Int. Cl.
*C07F 5/02* (2006.01)

(52) U.S. Cl.
CPC .................................. *C07F 5/025* (2013.01)

(58) Field of Classification Search
CPC .................................. C07F 5/025; C07F 5/02
USPC ............................................................ 568/6
See application file for complete search history.

(56) References Cited

U.S. PATENT DOCUMENTS

| | | | |
|---|---|---|---|
| 2010/0222343 | A1 | 9/2010 | Cai et al. |
| 2012/0088764 | A1 | 4/2012 | Cai et al. |
| 2014/0155595 | A1 | 6/2014 | Cai et al. |
| 2015/0203509 | A1 | 7/2015 | Cai et al. |
| 2015/0353552 | A1 | 12/2015 | Achab et al. |
| 2017/0362251 | A1 | 12/2017 | Cai et al. |
| 2019/0352310 | A1 | 11/2019 | Cai et al. |
| 2020/0339593 | A1 | 10/2020 | Cai et al. |
| 2021/0214370 | A1 | 7/2021 | Cai et al. |
| 2022/0402934 | A1 | 12/2022 | Cai et al. |

FOREIGN PATENT DOCUMENTS

| | | |
|---|---|---|
| JP | 2012514650 A | 6/2012 |
| JP | 2015537010 A | 12/2015 |

OTHER PUBLICATIONS

International Search Report issued in corresponding International Application No. PCT/JP2022/012043 mailed May 31, 2022 (5 pages).
Joey L. Methot et al., "Optimization of Versatile Oxindoles as Selective PI3Kσ Inhibitors", ACS Medicinal Chemistry Letters, 2020, vol. 11, pp. 2461-2469 (10 pages).
Desmond J. Brown et al., "Simple Pyrimidines. XVII* The Effect of 4'(6')-Substituents on the lonization of 2-(Pyrimidin-2' -yl)acetic Acid", Aust. J. Chem., 1978, vol. 31, pp. 649-659 (12 pages).
Michael G. N. Russell et al., "Discovery of Functionally Selective 7,8,9, 10-Tetrahydro-7, 10-ethano-1,2,4-triazolo[3,4-a] phthalazines as GABAA Receptor Agonists at the a3 Subunit", J. Med. Chem. 2005, vol. 48, No. 5, pp. 1367-1383 (17 pages).

*Primary Examiner* — Ana Z Muresan
(74) *Attorney, Agent, or Firm* — Osha Bergman Watanabe & Burton LLP

(57) ABSTRACT

A method for producing a (2-methylpyrimidin-5-yl)boronic acid derivative (3) includes the step of decarboxylating a 5-bromopyrimidine derivative (1) to synthesize 5-bromo-2-methylpyrimidine (2). The method enables efficient production of 5-bromo-2-methylpyrimidine (2) with less environmental impact, leading to efficient production of (2-methylpyrimidin-5-yl)boronic acid derivative (3) which is useful as a pharmaceutical intermediate.

(1)

(2)

(3)

7 Claims, 1 Drawing Sheet

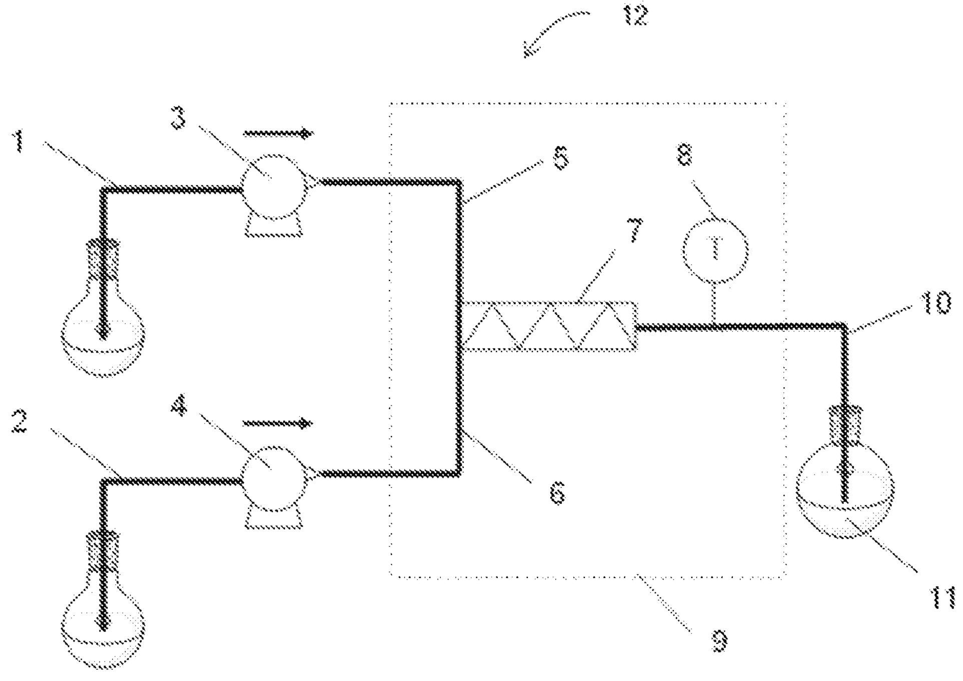
12
1
3
5
8
7
10
2
4
6
11
9

METHOD FOR PRODUCING (2-METHYLPYRIMIDIN-5-YL)BORONIC ACID DERIVATIVE

TECHNICAL FIELD

One or more embodiments of the present invention relate to a method for producing a (2-methylpyrimidin-5-yl)boronic acid derivative which is useful as a pharmaceutical intermediate.

BACKGROUND

In the following known methods for producing a (2-methylpyrimidin-5-yl)boronic acid derivative, 5-bromo-2-methylpyrimidine is produced as a synthetic intermediate.

In PTL 1, 5-bromo-2-iodopyrimidine is reacted with dimethylzinc in the presence of a palladium catalyst to produce 5-bromo-2-methylpyrimidine. Subsequently, the obtained 5-bromo-2-methylpyrimidine is reacted with n-butyllithium at −78° C. to be converted to 2-methyl-5-lithiopyrimidine, and thus obtained 2-methyl-5-lithiopyrimidine is reacted with triisopropyl borate to produce (2-methylpyrimidin-5-yl)boronic acid through hydrolysis reaction.

In PTL 2, acetamidine hydrochloride is reacted with mucobromic acid in the presence of sodium ethoxide to produce 5-bromo-2-methylpyrimidine-4-carboxylic acid, and thus obtained product is then converted to 5-bromo-2-methylpyrimidine. Subsequently, a mixture consisting of 5-bromo-2-methylpyrimidine, bis(pinacolato)diboron, $PdCl_2(dppf)_2$, and potassium acetate is reacted at 85° C. to produce 2-methyl-5-(4,4,5,5-tetramethyl-1,3,2-dioxaborolan-2-yl)pyrimidine.

PATENT LITERATURE

[PTL 1] JP-A-2015-537010

[PTL 2] JP-A-2012-514650

However, in the method described in PTL 1, a heavy metal reagent used in the production step of 5-bromo-2-methylpyrimidine has an enormous impact on the environment. Although a heavy metal reagent is not used in the production step of 5-bromo-2-methylpyrimidine in the method described in PTL 2, the yield in a synthetic step of 5-bromo-2-methylpyrimidine-4-carboxylic acid is 42%, and the yield in a subsequent synthetic step of 5-bromo-2-methylpyrimidine is 61%; therefore, these yields need to be improved.

SUMMARY

As a result of earnest studies, the inventors have developed a method for producing a (2-methylpyrimidin-5-yl) boronic acid derivative on an industrially implementable scale, and have led to the completion of one or more embodiments of the present invention.

One or more embodiments of the present invention have the following features [1] to [8].

[1] A method for producing a (2-methylpyrimidin-5-yl) boronic acid derivative represented by the following Formula (3);

(3)

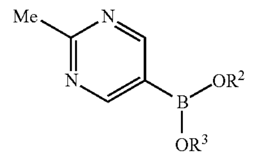

wherein $R^2$ and $R^3$ each independently represent a hydrogen atom or a $C_{1-6}$ alkyl group optionally having a substituent, and $R^2$ and $R^3$ may be combined to form a ring, comprising the step of decarboxylating a 5-bromopyrimidine derivative represented by the following Formula (1);

(1)

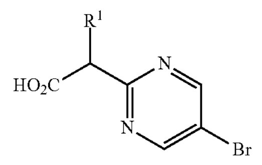

wherein $R^1$ represents a hydrogen atom or $CO_2H$, to synthesize a 5-bromo-2-methylpyrimidine represented by the following Formula (2).

(2)

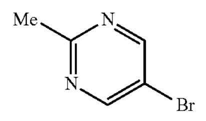

[2] The production method according to [1], wherein the step of decarboxylation is carried out at a temperature of 150° C. or lower.

[3] The production method according to [1] or [2], wherein the step of decarboxylation is carried out in at least one solvent selected from the group consisting of $C_{1-5}$ alcohol and water.

[4] The production method according to any one of [1] to [3], comprising the step of producing the (2-methylpyrimidin-5-yl)boronic acid derivative by bringing the 5-bromo-2-methylpyrimidine, a trialkoxyboron compound, and an organolithium reagent into contact in a flow reactor.

[5] The production method according to [4], wherein the 5-bromo-2-methylpyrimidine, the trialkoxyboron compound, and the organolithium reagent are brought into contact at a temperature of −50° C. or higher

[6] The production method according to [4] or [5], wherein a solution containing the 5-bromo-2-methylpyrimidine and the trialkoxyboron compound is contacted with the organolithium reagent.

[7] The production method according to any one of [4] to [6], wherein the trialkoxyboron compound is triisopropyl borate.

[8] The production method according to any one of [4] to [7], wherein the organolithium reagent is n-butyllithium.

According to one or more embodiments of the present invention, a (2-methylpyrimidin-5-yl)boronic acid derivative which is useful as a pharmaceutical intermediate can be produced efficiently by a method having less impact on the environmental. Specifically, according to one or more embodiments of the present invention, 5-bromo-2-methylpyrimidine as a synthetic intermediate for (2-methylpyrimidin-5-yl)boronic acid derivative can be produced efficiently without a heavy metal reagent.

BRIEF DESCRIPTION OF THE DRAWINGS

The FIGURE is a schematic diagram illustrating an exemplary configuration of a flow reactor employed in one or more embodiments of the present invention.

DETAILED DESCRIPTION

Hereinafter, a production method for a (2-methylpyrimidin-5-yl)boronic acid derivative according to one or more embodiments of the present invention will be described in detail.

A raw material of one or more embodiments of the present invention, 5-bromopyrimidine derivative, is represented by the following Formula (1):

(1)

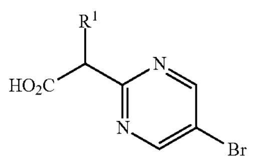

wherein, $R^1$ represents a hydrogen atom or $CO_2H$.

An intermediate of one or more embodiments of the present invention, 5-bromo-2-methylpyrimidine, is represented by the following Formula (2):

(2)

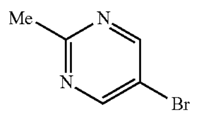

A product of one or more embodiments of the present invention, (2-methylpyrimidin-5-yl)boronic acid derivative, is represented by the following Formula (3):

(3)

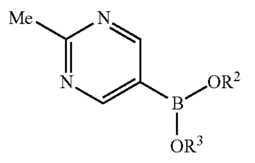

wherein, $R^2$ and $R^3$ each independently represent a hydrogen atom or a $C_{1-6}$ alkyl group optionally having a substituent, and $R^2$ and $R^3$ may be combined to form a ring.

Examples of the $C_{1-6}$ alkyl group represented by $R^2$ and $R^3$ include chain alkyl groups such as methyl group, ethyl group, n-propyl group, isopropyl group, n-butyl group, isobutyl group, tert-butyl group, n-penthyl group, and neopenthyl group; and cycloalkyl groups such as cyclopropyl group, cyclopenthyl group, and cyclohexyl group.

When $R^2$ and $R^3$ are combined to form a ring, the ring consists of a group formed by the combination of $R^2$ and $R^3$, a boron atom, and an oxygen atom. The group formed by the combination of $R^2$ and $R^3$ is a divalent group represented by $*—R^{2a}—R^{3a}—*$. * represents a point of attachment to an oxygen atom, Rea is a divalent group formed by removal of a hydrogen atom from $R^2$, and $R^{3a}$ is a divalent group formed by removal of a hydrogen atom from $R^3$. Examples of the group formed by the combination of $R^2$ and $R^3$ include ethylene group, 1,1,2,2-tetramethylethylene group, 1,1'-bicyclohexane-1, 1'-diyl group, and 2,2-dimethylpropane-1,3-diyl group. The ring formed by the combination of $R^2$ and $R^3$ may be a 5-membered or 6-membered ring, or a 5-membered ring. In case where $R^2$ and $R^3$ are combined to form a ring, a (2-methylpyrimidin-5-yl)boronic acid derivative is specifically exemplified with compounds represented by the following Formulae (4) to (7), and the compound represented by the following Formulae (4) or (5) is preferable.

(4)

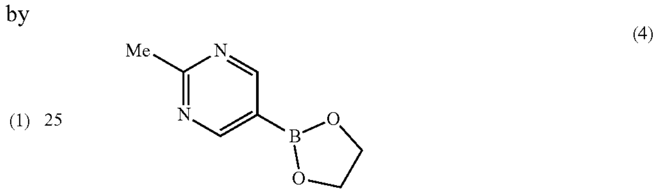

(5)

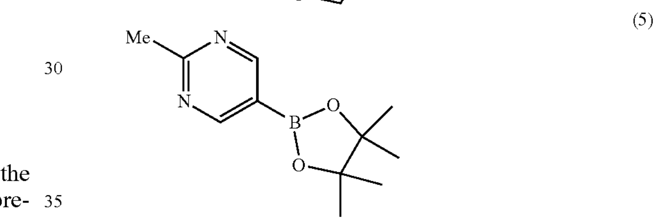

(6)

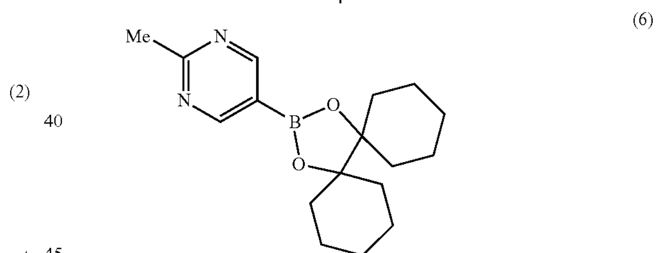

(7)

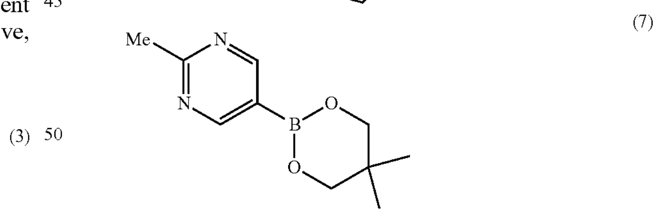

Examples of the substituent that the $C_{1-6}$ alkyl group optionally has include halogen atoms such as fluorine atom, chlorine atom, bromine atom, and iodine atom; alkoxy groups such as methoxy group and ethoxy group; cyclic ether groups such as epoxy group; alkylthio groups such as methylthio group; acetyl group; cyano group; nitro group; alkoxycarbonyl groups such as methoxycarbonyl group and ethoxycarbonyl group; and dialkylamino groups such as dimethylamino group and diethylamino group. The number of the substituent that the $C_{1-6}$ alkyl group has is not particularly limited.

In one or more embodiments, both of $R^2$ and $R^3$ are hydrogen atoms or isopropyl groups, or a group formed by the combination of $R^2$ and $R^3$ is 1,1,2,2-tetramethylethylene group. Both of $R^2$ and $R^3$ may be hydrogen atoms.

Next, with respect to a method for manufacturing the (2-methylpyrimidin-5-yl)boronic acid derivative represented by the Formula (3), a synthesis step of 5-bromo-2-methylpyrimidine (2) (hereinafter, sometimes referred to as 'compound (2)') involving decarboxylation of the 5-bromopyrimidine derivative (1) (hereinafter, sometimes referred to as 'compound (1)') will be described first.

The compound (1), which is a raw material of the above step, is obtained by, for example, hydrolyzing a compound represented by the following Formula (1a) (hereinafter, sometimes referred to as 'compound (1a)').

(1a)

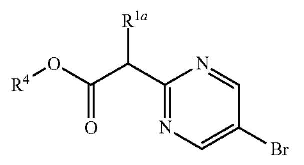

In the formula, $R^{1a}$ represents a hydrogen atom or —$COOR^{4a}$. $R^4$ and $R^{4a}$ each represent an alkyl group.

The alkyl group represented by $R^4$ and $R^{4a}$ may be a $C_{1-6}$ alkyl group. Specific examples of the $C_{1-6}$ alkyl group include the same groups as those mentioned for the $C_{1-6}$ alkyl group represented by $R^2$ and $R^3$. Among them, a chain alkyl group is preferable, and a $C_{1-4}$ chain alkyl group is more preferable.

$R^{1a}$ may be —$COOR^{4a}$.

The hydrolysis reaction is normally carried out in the presence of (i) water and (ii) acid or base. Water-soluble organic solvent may be used as a solvent together with water. The water-soluble organic solvent may be an alcohol solvent such as methanol, ethanol, n-propanol, isopropanol, n-butanol, or ethylene glycol.

The amount of the solvent should not be large in terms of cost and post-treatment; therefore, the upper limit may be 50 times by weight or less, or 20 times by weight or less with respect to the compound (1a). The lower limit of the amount of the solvent is, for example, 1 time by weight or more with respect to the compound (1a).

The base is exemplified with alkali metal hydroxides such as sodium hydroxide and potassium hydroxide. These bases may be used alone or in combination of two or more thereof.

The acid is exemplified with inorganic adds such as hydrochloric acid, sulfuric acid, and phosphoric add; and organic acids such as sulfonic acids including methanesulfonic and carboxylic acids including acetic acid and citric acid. These adds may be used alone or in combination of two or more thereof.

In the hydrolysis reaction, 1 to 10 mol of base or acid may be used with respect to 1 mol of the compound (1a).

The reaction temperature may be 20° C. to 120° C., or 30° C. to 80° C. The reaction time is usually 0.1 to 24 hours.

In case where the hydrolysis reaction is carried out in the presence of acid, the compound (1) can be synthesized directly. In case where the hydrolysis reaction is carried out in the presence of base, a hydrolysate (salt) such as an alkali metal salt of the compound (1) is obtained; therefore, the synthesis step of the compound (1) from the hydrolysate (salt) is also required.

When the hydrolysis reaction is carried out in the presence of base, the obtained hydrolysate (salt) may be isolated or purified, if needed, after the completion of the hydrolysis reaction, or the hydrolysate (salt) may be treated as a reaction mixture without being isolated and purified, to synthesize the compound (1). Specifically, the compound (1) can be synthesized by adding acid to the reaction mixture. Hereinafter, the solution obtained by adding acid to the reaction mixture is sometimes referred to as 'add solution containing the compound (1)'.

The acid is exemplified with inorganic adds such as hydrochloric acid, sulfuric acid, and phosphoric acid; and organic acids such as sulfonic acids including methanesulfonic and carboxylic acids including acetic acid and citric acid. These adds may be used alone or in combination of two or more thereof.

The amount of acid added may be the amount which enables the pH value of the acid solution containing the compound (1) to be controlled to 2 to 5.

After the hydrolysis in the presence of base and subsequent addition of acid, or when the hydrolysate (compound (1)) obtained by hydrolysis in the presence of acid remains without being decarboxylated, the resulting reaction solution may be subjected to a general treatment for obtaining a product from a reaction solution to obtain the compound (1). For example, a commonly used extraction solvent, such as toluene, methylene chloride, diethyl ether, ethyl acetate, hexane, tetrahydrofuran, or 2-methyltetrahydrofuran is added to the reaction solution to extract the compound (1), then the obtained extract is subjected to operation such as heating or decompression to distill off the reaction solvent and the extraction solvent, and the compound (1) can be obtained.

Thus obtained compound (1) has sufficient purity for the use in a subsequent step. The purity of the compound may be further improved by general purification method such as fractional distillation, column chromatograph, or activated carbon treatment so that a yield in a subsequent step or purity of a compound which is obtained in a subsequent step can be further enhanced.

The reaction may be proceeded to the step of decarboxylation without isolation of the compound (1) from the acid solution containing the compound (1) or the reaction solution obtained by the hydrolysis in the presence of an add. In case where the hydrolysis is carried out in the presence of acid, the decarboxylation may be started right after the hydrolysis is started.

The production method for the compound represented by Formula (1a) is not particularly limited. The compound may be produced, for example, by the following method a or method b described in Tetrahedron, 2009, 65, 757-764.

Method a: a method for producing a 2-(5-bromopyrimidin-2-yl)acetic acid alkyl ester (a compound having $R^{1a}$ of a hydrogen atom in Formula (1a) such as 2-(5-bromopyrimidin-2-yl)methyl acetate) through the reaction between 5-bromo-2-chloropyrimidine and a malonic acid alkyl ester (for example, tert-butyl malonate and methyl malonate) in the presence of sodium hydride to obtain 2-(5-bromopyrimidin-2-yl)malonic acid alkyl ester (for example, 2-(5-bromopyrimidin-2-yl)malonate tert-butyl and 2-(5-bromopyrimidin-2-yl)methyl malonate) and subsequent hydrolysis of the obtained ester.

Method b: a method for producing 2-(5-bromopyrimidin-2-yl)dialkyl malonate (a compound having $R^{1a}$ of —$COOR^{4a}$ in Formula (1a) such as 2-(5-bromopyrimidin-2-yl)diethyl malonate) through the reaction between 5-bromo-2-chloropyrimidine and a dialkyl malonate (for example, diethyl malonate) in the presence of sodium hydride.

By placing the compound (1) under appropriate conditions (preferably under heating conditions), the decarboxylation reaction proceeds and 5-bromo-2-methylpyrimidine (2), a target product of this step, can be obtained. The reaction may be carried out without the presence of a solvent or may be carried out with the addition of a solvent for improving heating efficiency and operability. The solvent is not particularly limited, preferred is water or an alcohol solvent, and more preferred is a $C_{1-5}$ alcohol or water. Specifically, the solvent is methanol, ethanol, n-propanol, isopropanol, n-butanol, ethylene glycol, or water, and may be ethanol or water. These solvents may be used alone or in combination of two or more thereof and the mixing ratio of them are not particularly limited.

The amount of the solvent should not be large in terms of cost and post-treatment. Therefore, the upper limit of the amount of the solvent may be 50 times by weight or less, or 20 times by weight or less with respect to the compound (1). The lower limit of the amount of the solvent may be, for example, 1 time by weight or more, or 5 times by weight or more with respect to the compound (1).

The upper limit of the reaction temperature of the step may be 150° C., 100° C., or 80° C. The lower limit may be 0° C., or 30° C.

The reaction time of the step is not particularly limited and can be appropriately determined. The reaction time may be 0.001 to 72 hours, or 0.1 to 48 hours.

In the step, the acid solution containing the compound (1) may be placed under appropriate conditions (preferably under heating conditions) so that the hydrolysis reaction of the compound (1a) and the decarboxylation reaction can be continuously carried out.

After the completion of the reaction, the resulting reaction solution may be subjected to a general treatment for obtaining a product from a reaction solution. For example, general extraction solvent such as toluene, methylene chloride, diethyl ether, ethyl acetate, hexane, tetrahydrofuran, or 2-methyltetrahydrofuran is added to the reaction solution to extract the compound (2), then the obtained extract is subjected to an operation such as heating or decompression to distill off the reaction solvent and the extraction solvent, and the compound (2) can be obtained.

Thus obtained compound (2) has sufficient purity for the use in a subsequent step. The purity of the compound may be further improved by general purification method such as fractional distillation, column chromatograph, or activated carbon treatment so that a yield in a subsequent step or purity of a compound which is produced in a subsequent step can be further enhanced.

According to the above step, 5-bromo-2-methylpyrimidine (2) can be produced efficiently without a heavy metal reagent having high impact on the environment. In the synthesis of 5-bromo-2-methylpyrimidine (2) from the compound (1a) by the above method, the total yield may be, for example, 75% or more, 80% or more, or 85% or more.

Subsequently, a method for producing (2-methylpyrimidin-5-yl)boronic acid derivative (3) (hereinafter, sometimes referred to as 'the compound (3)') from 5-bromo-2-methylpyrimidine (2) will be described.

The compound (3) can be produced specifically by the methods, for example, described in PTLs 1 and 2. More specific examples of the production method include a method (hereinafter, sometimes referred to as 'method c') in which 5-bromo-2-methylpyrimidine (2), a trialkoxyboron compound, and an organolithium reagent are brought into contact with each other and a method (hereinafter, sometimes referred to as 'method d') in which 5-bromo-2-methylpyrimidine (2), a diboronic acid ester compound, a palladium catalyst, and base are brought into contact with each other.

First, the method c will be described.

In the method c, a mixture containing 5-bromo-2-methylpyrimidine (2) and trialkoxyboron compound may be contacted with an organolithium reagent, and the compound (3), a target product, can be obtained at higher yield. The mixture may be brought into contact in the form of a solution, and the organolithium reagent may be brought into contact in the form of a solution. In case where the mixture is in the form of a solution, the solution may be prepared as a raw material solution A obtained by dissolving 5-bromo-2-methylpyrimidine (2) and a trialkoxyboron compound in an organic solvent. In case where the organolithium reagent is in the form of a solution, the solution may be prepared as a raw material solution B obtained by dissolving an organolithium reagent in an organic solvent.

An example of the trialkoxyboron compound is a compound represented by the following Formula (30).

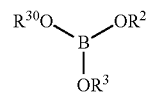

(30)

In the formula, $R^2$ and $R^3$ represent the same as above, and $R^{30}$ represents an alkyl group.

The alkyl group represented by $R^{30}$ may be a $C_{1-6}$ alkyl group. Specific examples of the $C_{1-6}$ alkyl group include the same groups as those mentioned for the $C_{1-6}$ alkyl group represented by $R^2$ and $R^3$. Among them, a chain alkyl group is preferable, a $C_{1-4}$ chain alkyl group is more preferable, and a methyl group, an ethyl group, or an isopropyl group is further preferable.

Specific examples of the trialkoxyboron compound include trimethoxyborate, triethoxyborate, triisopropylborate, methoxyboronic acid ethylene glycol ester, methoxyboronic acid pinacol ester, ethoxyboronic acid pinacol ester, and isopropoxyboronic acid pinacol ester. Among them, triisopropylborate, methoxyboronic acid pinacol ester, ethoxyboronic acid pinacol ester, and isopropoxyboronic acid pinacol ester are preferable, and triisopropylborate is more preferable.

The amount of the trialkoxyboron compound may be, for example, 0.1 to 10 eq, 0.5 to 10 eq, 0.8 to 5 eq, or 1 to 2 eq with respect to 5-bromo-2-methylpyrimidine (2). Here, 'equivalent', or 'eq', is the value determined by the amount of substance of the trialkoxyboron compound/the amount of substance of 5-bromo-2-methylpyrimidine (2).

Examples of the organolithium reagent include methyllithium, n-butyllithium, sec-butyllithium, tert-butyllithium, n-hexyllithium, n-heptyllithium, and phenyllithium. Among them, n-butyllithium and n-hexyllithium are preferable, and n-butyllithium is more preferable.

The amount of the organolithium reagent may be, for example, 0.1 to 10 eq, 0.5 to 10 eq, 0.8 to 5 eq, or 1 to 2 eq with respect to the compound (2). By controlling the amount of the organolithium reagent to preferably 1.05 to 5 eq, more preferably 1.10 to 3 eq, and further preferably 1.13 to 2 eq with respect to the compound (2), (2-methylpyrimidin-5-yl) boronic acid derivative (3), a target product, can be produced more efficiently. Here, 'equivalent', or 'eq', is the value determined by the amount of substance of the organolithium reagent/the amount of substance of the compound (2).

The solution containing 5-bromo-2-methylpyrimidine (2) and the trialkoxyboron compound (preferably raw material solution A) is prepared by dissolving 5-bromo-2-methylpyrimidine (2) and the trialkoxyboron compound in an organic solvent (hereinafter, sometimes referred to as 'organic solvent A'). Examples of the organic solvent A include aliphatic hydrocarbon-based solvents such as n-hexane, n-heptane, cyclohexane, and methylcyclohexane; aromatic hydrocarbon-based solvents such as benzene, toluene, and xylene; ether-based solvents such as diethyl ether, diisopropyl ether, tetrahydrofuran, 2-methyltetrahydrofuran, 4-methyltetrahydropyran, methyl tert-butyl ether, 1,4-dioxane, and cyclopentyl methyl ether. These organic solvents A may be used alone or in combination of two or more thereof and the mixing ratio of them are not particularly limited. In the method c, from the viewpoint of reactivity and post-treatment, the organic solvent A may be at least one selected from the group consisting of the aromatic hydrocarbon-based solvent and the ether-based solvent, or at least one selected from the group consisting of toluene, tetrahydrofuran, 2-methyltetrahydrofuran, 4-methyltetrahydropyran, methyl tert-butyl ether, and cyclopentyl methyl ether.

The amount of the organic solvent A may be, for example, 0.1 parts by weight or more, 0.5 parts by weight or more, or 1.0 part by weight or more, and may be, for example, 100 parts by weight or less, 50 parts by weight or less, 30 parts by weight or less, or 10 parts by weight or less, with respect to 1 part by weight of the compound (2).

The raw material solution B is prepared by dissolving the organolithium reagent in an organic solvent (hereinafter, sometimes referred to as 'organic solvent B'). Examples of the organic solvent B include aliphatic hydrocarbon-based solvents such as n-hexane, n-heptane, cyclohexane, and methylcyclohexane; aromatic hydrocarbon-based solvents such as benzene, toluene, and xylene; ether-based solvents such as diethyl ether, diisopropyl ether, tetrahydrofuran, 2-methyltetrahydrofuran, 4-methyltetrahydropyran, methyl tert-butyl ether, 1,4-dioxane, and cyclopentyl methyl ether. These organic solvents B may be used alone or in combination of two or more thereof, and the mixing ratio of them are not particularly limited. In the step c, from the viewpoint of storage stability of the organolithium reagent, the organic solvent B may be at least one selected from the group consisting of an aliphatic hydrocarbon-based solvent and an aromatic hydrocarbon-based solvent, or at least one selected from the group consisting of n-hexane, n-heptane, cyclohexane, methylcyclohexane, and toluene.

The amount of the organic solvent B may be, for example, 0.1 parts by weight or more, parts by weight or more, or 1.0 part by weight or more, and may be, for example, 100 parts by weight or less, 50 parts by weight or less, or 30 parts by weight or less with respect to 1 part by weight of the compound (2). The amount of the organic solvent B may be, for example, 0.1 parts by weight or more, 0.5 parts by weight or more, or 1.0 part by weight or more, and may be, for example, 100 parts by weight or less, 50 parts by weight or less, or 30 parts by weight or less with respect to 1 part by weight of the organolithium reagent.

In the method c, the reaction temperature may be, for example, 100° C. or lower, 50° C. or lower, or 25° C. or lower. When batch reaction is employed in the method c, cryogenic conditions such as lower than −70° C. is required to enhance a yield. The lower limit of the reaction temperature is, for example, −90° C. or higher.

Thus obtained reaction solution is appropriately post-treated, if needed. For example, the reaction in the reaction solution may be stopped (quenched) by the addition of a reagent (a quenching agent) for stopping the reaction into the reaction solution. The reagent is exemplified with water; acidic aqueous solutions such as hydrochloric acid, sulfuric acid, phosphoric acid, acetic acid, citric acid, and ammonium chloride; alkaline aqueous solutions such as sodium hydroxide, potassium carbonate, and sodium bicarbonate. To the obtained reaction solution or quenched solution, an organic solvent such as ethyl acetate or toluene may be added, if needed, to extract a target compound.

The amount of water, the acidic aqueous solution, and the alkaline aqueous solution for quenching is not particularly limited. Normally, the lower limit of the amount may be 0.1 times by weight, 0.5 times by weight, or 1 time by weight, and the upper limit of the amount may be 100 times by weight, 80 times by weight, or 50 times by weight, with respect to the reaction substrate (i.e., the compound (2) as a raw material). When the product, (2-methylpyrimidin-5-yl) boronic acid derivative (3), needs to be obtained as a boronate ester (i.e., a compound in which at least one of $R^2$ and $R^3$ in Formula (3) is a $C_{1-6}$ alkyl group optionally having a substituent, or a compound in which $R^2$ and $R^3$ are combined to form a ring), quenching may be conducted while pH is kept around neutral by adding the reaction solution simultaneously with acid and the like to water. When the product needs to be obtained as a (2-methylpyrimidin-5-yl)boronic acid (i.e., a compound in which both of $R^2$ and $R^3$ in Formula (3) are hydrogen atoms), pH of the reaction solution in quenching may be kept acidic. To the reaction solution, an organic solvent such as ethyl acetate or toluene may also be added, if needed, for quenching in a two-layer system of water-organic solvent. Further, the obtained extract may be washed, if needed, with acidic water, inorganic salt water, or water, if needed. The target product can be obtained by distilling off the reaction solvent and the extraction solvent from the extract through an operation such as heating or decompression.

Thus obtained target compound has sufficient purity for the use in a subsequent process. The purity of the compound may be further improved by general purification method such as fractional distillation, column chromatograph, or activated carbon treatment so that a yield in a subsequent step or purity of a compound which is obtained in a subsequent step can be further enhanced.

Next, the method d will be described.

An example of the diboronic acid ester compound used in the method d is a compound represented by the following Formula (31).

(31)

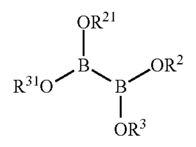

In the formula, $R^2$ and $R^3$ represent the same as above. $R^{21}$ and $R^{31}$ each independently represent a hydrogen atom or a $C_{1-6}$ alkyl group optionally having a substituent, and $R^{21}$ and $R^{31}$ may be combined to form a ring.

Examples of the $C_{1-6}$ alkyl group optionally having a substituent represented by $R^{21}$ and $R^{31}$ include the same groups as those described as the $C_{1-6}$ alkyl group optionally having a substituent represented by $R^2$ and $R^3$, and one or more embodiments are also the same. Examples of the ring formed through the combination of $R^{21}$ and $R^{31}$ include the same embodiments as those mentioned for the ring formed through the combination of $R^2$ and $R^3$, and one or more embodiments are also the same. $R^2$ and $R^3$ may be the same as or different from $R^{21}$ and $R^{31}$, or the same as $R^{21}$ and $R^{31}$.

Specific examples of the diboronic acid ester compound include bis(neopentyl glycolato)diboron, bis(pinacolato)diboron, bis(hexylene glycolato)diboron, bis(catecholato)diboron, bis(ethanediolato)diboron, bis(n-propanediolato)diboron, and bis(neopentanediolato)diboron. Among them, bis(neopentyl glycolato)diboron, bis(pinacolato)diboron, and bis(hexylene glycolato)diboron are preferable.

The amount of the diboronic acid ester compound may be 0.5 to 10 eq, 0.8 to 5 eq, or 1 to 2 eq with respect to the compound (2). Here, 'equivalent', or 'eq', is the value determined by the amount of substance of the diboronic acid ester compound/the amount of substance of the compound (2).

Examples of the palladium catalyst used in the method d include palladium(II) acetate, tetrakis(triphenylphosphine) palladium (0), dichlorobis(triphenylphosphine)palladium (II), dichlorobis(triethylphosphine)palladium(1), tris(dibenzylideneacetone)dipalladium(0), and [1,1'-bis (diphenylphosphino)ferrocene]dichloropalladium(II).

The amount of the palladium catalyst may be, for example, 0.0001 to 0.1 eq, or 0.001 to 0.01 eq with respect to the compound (2). Here, 'equivalent', or 'eq', is the value determined by the amount of substance of the palladium catalyst/the amount of substance of the compound (2).

Examples of the base used in the method d include alkali metal hydroxides such as sodium hydroxide and potassium hydroxide; alkali metal alkoxides such as sodium methoxide; alkali metal hydrogen carbonates such as sodium bicarbonate and potassium bicarbonate; alkali metal carbonates such as sodium carbonate and potassium carbonate; alkali metal phosphates such as potassium phosphate; and alkali metal salts of organic adds such as sodium acetate and potassium acetate. Among them, preferred is an alkali metal salt of organic add, and more preferred is an alkali metal salt of acetic acid.

The amount of the base may be 0.5 to 10 eq, 0.8 to 5 eq, or 1 to 3 eq with respect to the compound (2). Here, 'equivalent', or 'eq', is the value determined by the amount of substance of the base/the amount of substance of the compound (2).

In the method d, the reaction may be carried out in the presence of a solvent. Examples of the solvent used in the method d include the aliphatic hydrocarbon-based solvents, aromatic hydrocarbon-based solvents, and ether-based solvents described as solvents for the organic solvent A. These solvents may be used alone or in combination of two or more thereof and the mixing ratio of them is not particularly limited. In the method d, an ether-based solvent may be used.

The amount of the solvent may be, for example, 0.1 parts by weight or more, 0.5 parts by weight or more, or 1.0 part by weight or more, and may be, for example, 100 parts by weight or less, 50 parts by weight or less, or 30 parts by weight or less with respect to 1 part by weight of the compound (2).

In the method d, the reaction temperature may be 20 to 120° C., 50 to 100° C., or 70 to 90° C.

In the method d, the reaction time is not particularly limited. The reaction time may be, for example, 30 minutes to 24 hours, or 1 hour to 12 hours.

Thus obtained reaction solution is appropriately post-treated, if needed. For example, after the reaction solution is filtrated, if needed, the reaction solution is subjected to an operation such as heating or decompression to distill off the reaction solvent, and the target compound is obtained.

Thus obtained target compound has sufficient purity for the use in a subsequent process. The purity of the compound may be further improved by general purification method such as fractional distillation, column chromatograph, or activated carbon treatment so that a yield in a subsequent step or purity of a compound which is obtained in a subsequent step can be further enhanced.

In the methods c and d, a batch reaction, or a flow reactor may be employed to produce the target product. When a flow reactor is employed in the method c, production can be carried out efficiently without cryogenic conditions such as a reaction at −78° C. adopted in PILL therefore, such a method is preferable from the point of production on an industrial scale. In the method e involving the use of a flow reactor, the solution containing 5-bromo-2-methylpyrimidine (2) and the trialkoxyboron compound (i.e., raw material solution A) fed from feeding channel of raw material 1 of the flow reactor and the solution of organolithium reagent (i.e., raw material solution B) fed from feeding channel of raw material 2 different from feeding channel of raw material 1 may be reacted to produce (2-methylpyrimidin-5-yl)boronic acid derivative (3).

The flow reactor includes a micro-flow reactor utilizing a microchannel in the order of submillimeter and a chemical reaction apparatus scaled-up based on the micro-flow reactor. Due to its micro-scale reaction field, i.e., a microchannel, the micro-flow reactor has specific effects such as high-speed mixing performance (for example, mixing of two liquids in a micro-space decreases mass diffusion distance in the liquids, thereby enabling mass transfer to be significantly accelerated), heat removal efficiency (the small reaction field enables significantly high thermal efficiency and thus easy controlling of temperature), reaction control performance, interface control performance. In addition, the micro-flow reactor also has advantages in that downsizing of the entire process enables improvement in safety and significant reduction in the cost of equipment, incorporation of the micro-flow reactor into existing process intensifies the process, and the micro-flow reactor enables the production of substances that have not been produced by existing production methods. The flow reactor includes a chemical reaction apparatus in which the diameter of a flow channel is enlarged to the order of millimeters to centimeters to improve operability without sacrificing the characteristics of the micro-flow reactor. Such a flow reactor can handle increased throughput and can be adapted to practical use. Specifically, the flow reactor is equipped with two or more of feeding channels of raw material (which may be feeding portions of or feeding lines of raw material, or may be specified as "raw material feeding ports"), a mixing unit in which raw materials fed are mixed, a reactor unit in which a mixed solution of raw materials flows (which may be a reactor channel or a retention channel, or may be specified as a reactor line or a retention line), and a discharging channel of reaction solution in which the reaction solution that has been flown in the reaction unit is discharged (which may be a discharging portion of or a discharging line of reaction solution, or may be specified as a discharging port of reaction solution). When the mixing of raw materials is sufficiently conducted, the mixing unit and the reaction unit do not necessarily have a distinct boundary, the mixing unit may continuously change to the reaction unit, the mixing unit and the reaction unit may be integrated without distinction (hereinafter, a unit in which the mixing unit and the reaction unit are integrated without distinction is sometimes referred to as a 'mixing and reaction unit'), or the mixing unit and the reaction may be independent of one another. The flow channel in the mixing unit and the reaction unit may be a microchannel, a linear channel such as a tube, or a spiral channel.

The flow reactor may be equipped with a reaction solution storage container to collect the reaction solution discharged from the discharging channel of reaction solution. A quenching agent may be contained in the reaction solution storage container in advance, or may be added to the reaction solution storage container after the reaction solution is collected in the container, to stop a reaction.

The flow reactor may be equipped with liquid feeding apparatus such as a pump.

The flow reactor may be equipped with a temperature controller such as temperature control mom, temperature control bath, jacket container, or heating medium channel to control the temperature of at least one of the feeding channel of raw material, the mixing unit, or the reaction unit (mixing and reaction unit is allowable). The flow reactor may be equipped with a temperature sensor to confirm the temperature of the reaction solution.

The FIGURE is a schematic diagram illustrating an exemplary configuration of chemical reaction apparatus available in one or more embodiments of the present invention. As shown in the example, the chemical reaction apparatus (flow reactor 12) may be equipped with two or more of feeding channels of raw material (feeding channels of raw material 1 and 5, and 2 and 6 in the FIGURE) so that the raw material solution A and the raw material solution B can be separately fed, a mixing unit and a reaction unit (mixing and reaction unit 7 in the FIGURE) to mix the raw material solution A and the raw material solution B fed from the feeding channels and then conduct a reaction in the reaction solution, and a discharging channel of the reaction solution (discharging channel of reaction solution 10 in the FIGURE). The chemical reaction apparatus may also be equipped with a temperature controller (temperature controller 9 in the FIGURE) to control the reaction temperature or a temperature sensor (temperature sensor 8 in the FIGURE) to confirm the internal temperature, if needed.

In the FIGURE, the liquid feeders 3 and 4 for feeding raw material solutions into the mixing and reaction unit 7 may be normally a liquid feeding pump such as a diaphragm pump, a syringe pump, a plunger pump, or a peristaltic pump.

In the FIGURE, although a static mixer is shown as a mixer for the mixing and reaction unit 7, the mixer may be a helix-type mixer. When the flow reactor has a mixing unit and a reaction unit separated from one another, the mixing unit and the reaction unit may have various shape. For example, the mixing unit may be a T-shape mixer (may be referred to as 'T-shape tube'), a Y-shape mixer (may be referred to as 'Y-shape tube'), or a V-shape mixer (may be referred to as 'V-shape tube'). The reaction unit may have a structure of micro flow channel engraved on a plate, may have a stacking structure of such plates into a laminate-shape, or may be a tube having significantly small diameter. The tube may have a structure of straight tube, a structure with a large number of bending points, or may be a helical structure.

The mixing and reaction unit 7 may have a tube shape, and the cross-section of the flow channel may be any of a circular, polygonal, or distorted circular (for example, convex or concave) shape, and a circular or polygonal shape is more preferable.

The length of the mixing and reaction unit 7 is appropriately determined depending on the reaction time (retention time). The length may be, for example, 0.5 cm or more, or 1.0 cm or more. The upper limit of the length of the mixing and reaction unit 7 may be, for example, 100 m or less, or 10 m or less.

In the mixing and reaction unit 7, the cross-sectional area of the flow channel may be, for example, 0.01 $mm^2$ or more, 0.15 $mm^2$ or more, or 0.3 $mm^2$ or more. The upper limit of the cross-sectional area of the flow channel in the mixing and reaction unit 7 may be, for example, 300 $cm^2$ or less, 70 $cm^2$ or less, or 30 $cm^2$ or less.

Materials for the mixing and reaction unit 7 are not particularly limited and can be appropriately selected depending on requirements, such as solvent resistance, pressure resistance, and heat resistance. Examples of the material include metals such as stainless steel, Hastelloy, titanium, copper, nickel, and aluminum; resins such as PEEK resin, silicone resin, and fluororesin; a glass; a ceramic; and SiC.

In the FIGURE, a flask is illustrated as the reaction solution storage container 11, in which a reaction solution is collected. The storage container is not limited to a flask and can be appropriately provided depending on the size of apparatus. The storage container may be a large tank or a reaction tank.

The chemical reaction apparatus available for one or more embodiments of the present invention is not limited to the flow reactor shown in the FIGURE, and know apparatus such as a plate microflow reactor, a cyclone-shaped reactor, or a laminated microfluidic chip may also be appropriately used.

The time (reaction time, retention time) for the reaction solution obtained by mixing the raw material solution A and the raw material solution B to flow in the mixing and reaction unit of the flow reactor may be appropriately determined depending on the type and the concentration of the raw material solution A and the raw material solution B in addition to the flow velocity to flow the raw material solution A and the raw material solution B in the flow channel. The time may be, for example, 0.001 milliseconds or more, 0.005 milliseconds or more, or 0.01 milliseconds or more, and may be, for example, 15 minutes or less, 10 minutes or less, or 5 minutes or less.

The flow velocity at which the raw material solution A and the raw material solution B flow in the feeding channels of raw materials and the flow velocity at which the reaction solution of the raw material solution A and the raw material solution B flows in the mixing and reaction unit can be appropriately determined depending on the type of the raw material solution A and the raw material solution B and the retention time at the mixing and reaction unit. The flow velocity may be, for example, 0.01 mL/min or more, 0.1 mL/min or more, or 0.5 mL/min or more, and may be, for example, 5000 ml/min or less, 3000 mL/min or less, or 1000 mL/min (60 L/hour) or less.

The amount of the organolithium reagent in the reaction unit (the mixing and reaction unit may be allowed) may be, for example, 0.1 to 10 eq, 0.5 to 10 eq, 0.8 to 5 eq, or 1 to 2 eq with respect to the compound (2). In the reaction unit (the mixing and reaction unit may be allowed), the amount of the organolithium reagent may be adjusted to 1.05 to 5 eq, or 1.10 to 2 eq with respect to the compound (2) in order to produce the target product of (2-methylpyrimidin-5-yl)boronic acid derivative (3) more efficiently. Here, 'equivalent', or 'eq', is a value determined by the amount of substance of the organolithium reagent/the amount of substance of the compound (2). In the reaction unit (mixing and reaction unit may be allowed), the amount of the organolithium reagent with respect to the compound (2) can be controlled by adjusting the concentration of the compound (2) in the raw material solution A and the concentration of the organolithium reagent in the raw material solution B, and/or the flow velocity of the raw material solution A and the raw material solution B.

The flow reactor may be equipped with a temperature control device to control the temperature of the mixing and reaction unit. In the FIGURE, the temperature control device is temperature controller 9. Examples of the temperature control device include a temperature control room, a temperature control bath, and a jacket container. The mixing unit and the reaction unit may be equipped with the temperature control device independently, or in common. As the reaction temperature of the raw material solution A and the raw material solution B (a temperature set to the temperature controller), the reaction temperature as described in the method c can be adopted. As described above, production of the target product can be conducted efficiently with a flow reactor in the method c, without cryogenic conditions. Therefore, the reaction temperature of the raw material solution A and the raw material solution B may be, for example, −70° C. or higher, −50° C. or higher, or −40° C. or higher, and may be, for example, 100° C. or lower, 50° C. or lower, 25° C. or lower, or 0° C. or lower.

The reaction solution discharged from the mixing and reaction unit may be appropriately post-treated, if needed. With reference to the FIGURE, the reaction solution discharged from the mixing and reaction unit 7 is collected in the reaction solution storage container 11, and then the collected reaction solution is post-treated. In the post-treatment step, the quenching agent may be contained in the reaction solution storage container 11 in advance to stop (quench) the reaction in the reaction solution collected in the reaction solution storage container 11. Examples of the post-treatment step such as quenching include the same steps as those described in the method c.

According to one or more embodiments of the present invention, the compound (2) as a synthetic intermediate for the compound (3) which is useful as a pharmaceutical intermediate can be produced efficiently without a heavy metal reagent. In one or more embodiments of the present invention, the yields are high through the two steps, immediately before the target compound (3) is obtained, including the step for synthesizing the compound (2) by decarboxylating the compound (1) and the step for producing the compound (3) from the compound (2), or through the three steps, immediately before the target compound (3) is obtained, including the step for synthesizing the compound (1) by hydrolyzing the compound (1a), the step for synthesizing the compound (2) by decarboxylating the compound (1), and the step for producing the compound (3) from the compound (2). These high yields enable efficient production of the compound (3) which is useful as a pharmaceutical intermediate. The total yield through the two steps or the three steps may be 35 mol % or more, 50 mol % or more, or 70 mol % or more.

The present application claims benefit of priority to Japanese Patent Application No. 2021-056124 filed on Mar. 29, 2021. The entire contents of the specification of Japanese Patent Application No. 2021-056124 filed on Mar. 29, 2021 are incorporated herein by reference.

EXAMPLES

Hereinafter, one or more embodiments of the present invention will be specifically described with Examples. However, the scope of one or more embodiments of the present invention is not limited by the Examples. One or more embodiments of the present invention can be carried out with modifications within a range conforming to the gist described above and/or below, all of which are included in the technical scope of one or more embodiments of the present invention.

In Examples and Reference Examples, the progress of reactions was confirmed by HPLC, and then mole conversion rates and reaction yields were determined. A mole conversion rate is a percentage of the amount of substance of target product relative to total amount of substance of reaction substrate and target product contained in a reaction solution. Conditions for HPLC analysis are as follows.

Column: TSK-GEL ODS-120T (250×4.6 mm, 5 μm), manufactured by Tosoh Corporation

Mobile phase: phosphate buffer solution (pH=2.5)/acetonitrile=7/3 (v/v)

Flow velocity: 1.0 ml/min

Detection wavelength: UV 254 nm

Column temperature: 40° C.

Reference Example 1: Production of diethyl 2-(5-bromopyrimidin-2-yl)malonate Under nitrogen atmosphere, 14.0 g of sodium hydride (purity: 65%, 0.39 mol) and 270 g of tetrahydrofuran (THF) were placed in a flask and cooled to 1° C. To the flask was added a solution, which was obtained by dissolving 37.3 g of diethyl malonate (0.23 mol) in 30 g of tetrahydrofuran, over 35 minutes. The mixture was stirred for 20 minutes, after that, a solution, which was obtained by dissolving 30 g of 2-chloro-5-bromopyrimidine (0.16 mol) in 300 g of tetrahydrofuran, was added thereto over 30 minutes. The resulting solution was stirred for 20 minutes, then heating of the solution was started to control the temperature of it to 65° C., and the solution was stirred for 19 hours. After the progress of reaction was confirmed by HPLC, the reaction solution was cooled to 25° C., and 300 g of toluene and 596 g of a saturated aqueous solution of ammonium chloride were added thereto. Then, 54 g of 30% sodium hydroxide solution was further added thereto to adjust pH value to 9. The resulting mixture was separated into two layers, and an aqueous layer was drained. The resulting organic layer was condensed to obtain 69.5 g of diethyl 2-(5-bromopyrimidin-2-yl)malonate (purity: 56%, yield: 79 mol %).

Example 1: Production of 5-bromo-2-methylpyrimidine

Under nitrogen atmosphere, 82.3 g of ethanol and 82.3 g of 30% sodium hydroxide aqueous solution were added to 69.5 g of diethyl 2-(5-bromopyrimidin-2-yl)malonate (purity: 56%, mol) synthesized in Reference Example 1. The temperature of the mixture was controlled to 55 to 59° C., and then the mixture was stirred for 1 hour. After the progress of reaction was confirmed by HPLC, the reaction solution was cooled to 25° C. To the solution was added 389.5 g of 1M citric acid aqueous solution over 1.5 hours to adjust pH value to 4. The temperature of the resulting solution was controlled to 68 to 76° C., and the solution was stirred for 20 hours. After the progress of reaction was confirmed by HPLC, the solution was cooled to 25° C. To the solution was added 200 g of toluene, the resulting mixture was separated into two layers, and the resulting aqueous layer and organic layer were obtained respectively. To the aqueous layer was added 200 g of toluene, the resulting mixture was separated into two layers, and the resulting aqueous layer was drained. The organic layer obtained from the first separation process and the organic layer obtained from the second separation process were mixed. To the mixture was added 80 g of a saturated saline solution, the resulting mixture was separated into two layers, and the resulting aqueous layer was drained. The resulting organic layer was condensed to obtain 156.7 g of 5-bromo-2-methylpyrimidine. The percentage peak area of the compound was 95% by HPLC, excluding the solvent of the condensate.

Example 2: Production of (2-methylpyrimidin-5-yl)boronic acid

Under nitrogen atmosphere, 155.5 g of 5-bromo-2-methylpyrimidine produced in Example 1 (0.90 mol), 35.9 g of triisopropyl borate (0.19 mol), and 225 ml of THF were mixed, and cooled to −71° C. To the mixture was added 115.4 ml of n-butyllithium/hexane solution (1.6 M, mol) over 1.5 hours, and the resulting solution was stirred at −71° C. for 1 hour. After the progress of reaction was confirmed by HPLC, the temperature of the reaction solution was raised to 0° C. To the solution was added 351.3 g of 20% ammonium chloride aqueous solution over 1 hour to adjust pH value to 8.8. The resulting mixture was then separated into two layers and the resulting organic layer was removed. The resulting aqueous layer was cooled to 0° C., and 19 g of concentrated hydrochloric acid was added thereto for adjustment of pH value to 4.0. Then, the resulting solution was stirred for 4 hours, and the resultant crystals were separated through filtration. The crystalline cake was washed with 84 g of cold water and dried at 40° C. for 23 hours under reduced pressure to obtain 12.2 g of (2-methylpyrimidin-5-yl)boronic acid (purity: 99%, total yield from diethyl 2-(5-bromopyrimidin-2-yl)malonate: 69 mol %) as white crystals.

Example 3: Production of 2-methyl-5-(4,4,5,5-tetramethyl-1,3,2-dioxaborolan-2-yl)pyrimidine Under nitrogen atmosphere, 0.499 g of 5-bromo-2-methylpyrimidine (2.89 mmol) produced in Example 1, 0.808 g of bis(pinacolato)diboron (1.1 eq), 0.567 g of potassium acetate (2.0 eq), 94.7 mg of $PdCl_2(dppf)_2$ (0.04 eq), and 5.00 g of dioxane were placed in a test tube, and reacted at 85° C. for 5 hours. The reaction solution was filtrated and condensed to obtain 1.1 g of 2-methyl-5-(4,4,5,5-tetramethyl-1,3,2-dioxaborolan-2-yl)pyrimidine (total yield from diethyl 2-(5-bromopyrimidin-2-yl)malonate: 81 mol %, purity: 47%).

The target compound of (2-methylpyrimidin-5-yl)boronic acid derivative was efficiently produced through synthesis of 5-bromo-2-methylpyrimidine involving decarboxylation of the 5-bromopyrimidine derivative, which was formed from diethyl 2-(5-bromopyrimidin-2-yl)malonate in the reaction system, as shown in Examples 2 and 3.

Example 4: Production of (2-methylpyrimidin-5-yl)boronic acid

Under nitrogen atmosphere, 500 ml of 2.5 M n-butyllithium/hexane solution and 500 ml of toluene were placed in a 1 L medium bottle and adequately mixed to form a uniform solution (raw material solution B). Next, 110 g of 5-bromo-2-methylpyrimidine (0.64 mol), 179 g of triisopropyl borate (0.95 mol), and 1540 g of tetrahydrofuran were placed in a 2 L medium bottle, and adequately mixed to form a uniform solution (raw material solution A; 5-bromo-2-methylpyrimidine: 0.31 M, triisopropyl borate: 0.31 M).

The following reaction was carried out in a flow reactor 12 shown in the FIGURE. Toluene and THF were fed into the flow channel of the flow reactor by diaphragm pumps (liquid feeders 3 and 4) for complete removal of moisture in the flow channel. After that, the temperature of a jacket of chiller (temperature controller 9) was set to −40° C. Next, the raw material solution B and the raw material solution A were fed at the velocity of 11.9 ml/min and 32.2 ml/min, respectively, to start flow reaction (retention time: 0.2 millisecond). After the internal temperature was stabilized, the reaction solution was collected in a reaction solution storage container 11 in an ice bath for 60 minutes.

To 2.271 kg of the collected reaction solution was added 1.76 kg of 20 wt % NH4Cl aqueous solution, at a rate which enabled the internal temperature to be kept at 5° C. or lower, and the solution was stirred for 10 minutes while the internal temperature was being maintained. Then, the solution was allowed to stand. After the solution was separate into 2 layers, the resulting aqueous layer was collected, adjusted to pH value of 4 with hydrochloric acid, and stirred at −2° C. for 15 hours. The precipitated crystals were separated by filtration, then the resulting wet cake was washed 2 times with 50 ml of cold water and dried at 40° C. under reduced pressure to obtain 66.2 g of (2-methylpyrimidin-5-yl)boronic acid (purity: 99.8%, yield: 80 mol %) as white crystals.

Example 5: Production of (2-methylpyrimidin-5-yl)boronic acid

Preparation example of raw material solution A: 100 g of 5-bromo-2-methylpyrimidine (0.58 mol), 164 g of triisopropyl borate (0.87 mop, and 1736 g of tetrahydrofuran were placed in a vessel and adequately mixed to form a uniform solution (5-bromo-2-methylpyrimidine: 0.245 M, triisopropyl borate: 0.368 M).

Preparation example of raw material solution B: 500 ml of 2.72 M n-butyllithium/hexane solution and 500 ml of toluene were placed in a vessel and adequately mixed to form a uniform solution (n-butyllithium: 1.36 M).

The following reaction was carried out in a flow reactor 12 shown in the FIGURE. Toluene and THF were fed into the flow channel of the flow reactor by diaphragm pumps (liquid feeders 3 and 4) for complete removal of moisture in the flow channel. After that, the temperature of a jacket of chiller (temperature controller 9) was set to −45° C. Next, the raw material solution B and the raw material solution A were fed at the velocity of 0.36 ml/min and 2.00 ml/min, respectively, to start flow reaction (retention time: 1.4 millisecond). After the internal temperature was stabilized, the reaction solution containing (2-methylpyrimidin-5-yl)boronic acid was collected in a reaction solution storage container 11 in an ice bath (mole conversion rate: 49%, reaction yield: 47%).

Examples 6 to 10: Productions of (2-methylpyrimidin-5-yl)boronic acid

Production of (2-methylpyrimidin-5-yl)boronic acid was conducted in the same manner as Example 5 except that retention time was controlled by changing flow velocity as described below. In Table 1 and the following Table 2, 'n-BuLi(eq)' represents an equivalent value of n-BuLi relative to 5-bromo-2-methylpyrimidine in the mixing and reaction unit 7.

TABLE 1

| | Flow velocity (ml/min) | | | | | |
|---|---|---|---|---|---|---|
| | Raw material solution A | Raw material solution B | Retention time (millisecond) | n-BuLi (eq) | Mole conversion rate (%) | Reaction yield (%) |
| Example 5 | 2.00 | 0.36 | 1.4 | 1.00 | 49 | 47 |
| Example 6 | 4.00 | 0.72 | 0.7 | 1.00 | 54 | 54 |
| Example 7 | 8.00 | 1.44 | 0.35 | 1.00 | 59 | 60 |
| Example 8 | 16.0 | 2.91 | 0.17 | 1.01 | 73 | 73 |
| Example 9 | 24.0 | 4.32 | 0.12 | 1.00 | 62 | 63 |
| Example 10 | 32.0 | 5.76 | 0.09 | 1.00 | 61 | 61 |

Examples 11 to 17: Productions of (2-methylpyrimidin-5-yl)boronic acid

Production of (2-methylpyrimidin-5-yl)boronic acid was conducted in the same manner as Example 5 except for changes in flow velocity and temperature of jacket as described below.

TABLE 2

| | Flow velocity (ml/min) | | | | Jacket | Mole | |
|---|---|---|---|---|---|---|---|
| | Raw material solution A | Raw material solution B | Retention time (millisecond) | n-BuLi (eq) | temperature (° C.) | conversion rate (%) | Reaction yield (%) |
| Example 11 | 16.0 | 3.35 | 0.17 | 1.16 | −45 | 85 | 80 |
| Example 12 | 16.0 | 3.78 | 0.16 | 1.31 | −45 | 95 | 85 |
| Example 13 | 16.0 | 4.37 | 0.16 | 1.51 | −45 | 100 | 88 |
| Example 14 | 16.0 | 3.78 | 0.16 | 1.31 | −35 | 87 | 82 |
| Example 15 | 16.0 | 3.78 | 0.16 | 1.31 | −25 | 98 | 72 |
| Example 16 | 16.0 | 4.00 | 0.16 | 1.40 | −35 | 90 | 81 |
| Example 17 | 16.0 | 4.32 | 0.16 | 1.50 | −35 | 97 | 87 |

In Examples 4 to 17, using the flow reactor was able to achieve production of (2-methylpyrimidin-5-yl)boronic acid from 5-bromo-2-methylpyrimidine at a temperature of −45° C. to −25° C., without cryogenic conditions lower than −70° C.

EXPLANATION OF LETTERS OR NUMERALS

1,2,5,6: feeding channel of raw material

3,4: liquid feeder

7: mixing and reaction unit

8: temperature sensor

9: temperature controller

10: discharging channel of reaction solution

11: reaction solution storage container

12: flow reactor

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

The invention claimed is:

1. A method for producing a (2-methylpyrimidin-5-yl) boronic acid derivative represented by the following Formula (3):

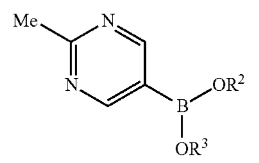

(3)

wherein $R^2$ and $R^3$ each independently represent a hydrogen atom or a $C_{1-6}$ alkyl group optionally having a substituent, and $R^2$ and $R^3$ may be combined to form a ring, the method comprising the steps of: decarboxylating a 5-bromopyrimidine derivative represented by the following Formula (1):

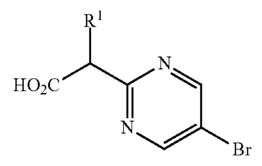

(1)

wherein $R^1$ represents a hydrogen atom or $CO_2H$, to synthesize a 5-bromo-2-methylpyrimidine represented by the following Formula (2):

(2)

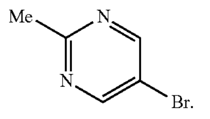

; and bringing the 5-bromo-2-methylpyrimidine, a trialkoxyboron compound, and an organolithium reagent into contact in a flow reactor, thereby producing the (2-methylpyrimidin-5-yl)boronic acid derivative.

2. The method according to claim 1, wherein the step of decarboxylation is carried out at a temperature of 150° C. or lower.

3. The method according to claim 1, wherein the step of decarboxylation is carried out in at least one solvent selected from the group consisting of a $C_{1-5}$ alcohol and water.

4. The method according to claim 1, wherein the 5-bromo-2-methylpyrimidine, the trialkoxyboron compound, and the organolithium reagent are brought into contact at a temperature of −50° C. or higher.

5. The method according to claim 1, wherein a solution containing the 5-bromo-2-methylpyrimidine and the trialkoxyboron compound is contacted with the organolithium reagent.

6. The method according to claim 1, wherein the trialkoxyboron compound is triisopropylborate.

7. The method according to claim 1, wherein the organolithium reagent is n-butyllithium.

* * * * *